United States Patent
Baldwin, Jr.

(10) Patent No.: US 9,320,996 B1
(45) Date of Patent: Apr. 26, 2016

(54) FILTER HOUSING UTILIZING HEAT SHRINKABLE MATERIALS

(71) Applicant: American Air Filter Company Inc., Louisville, KY (US)

(72) Inventor: Donald W. Baldwin, Jr., Taylorsville, KY (US)

(73) Assignee: American Air Filter Company, Inc., Louisville, KY (US)

( * ) Notice: Subject to any disclaimer, the term of this patent is extended or adjusted under 35 U.S.C. 154(b) by 91 days.

(21) Appl. No.: 14/054,186

(22) Filed: Oct. 15, 2013

(51) Int. Cl.
*B01D 46/00* (2006.01)

(52) U.S. Cl.
CPC .................. *B01D 46/0005* (2013.01)

(58) Field of Classification Search
CPC ........ B01D 46/02; B01D 46/10; B01D 46/13; B01D 46/16; B01D 46/63; B01D 46/521; B01D 46/2422
USPC ............ 55/484, 493, 497, 501–502, 509, 516
See application file for complete search history.

(56) References Cited

U.S. PATENT DOCUMENTS

| | | |
|---|---|---|
| 3,834,134 A | 9/1974 | McAllister |
| 4,391,054 A | 7/1983 | Schovee |
| 4,636,232 A | 1/1987 | McDowell |
| 4,865,637 A | 9/1989 | Gruber |
| 5,332,409 A * | 7/1994 | Dralle .......................... 55/484 |
| 5,456,836 A | 10/1995 | Jeffery et al. |
| 5,814,219 A | 9/1998 | Friedmann et al. |
| 6,027,542 A | 2/2000 | Brandhofer et al. |
| 6,299,772 B1 | 10/2001 | Huschke et al. |
| 6,652,629 B2 | 11/2003 | Wolff et al. |
| 7,350,646 B2 | 4/2008 | Durrant |
| 7,473,292 B2 | 1/2009 | Moriyama et al. |
| 8,182,751 B2 | 5/2012 | Shirk et al. |
| 2007/0075012 A1 | 4/2007 | Estochen et al. |
| 2010/0269468 A1 | 10/2010 | Crabtree et al. |
| 2012/0324849 A1 | 12/2012 | Ackermann et al. |
| 2013/0125520 A1 * | 5/2013 | Gorman .......................... 55/509 |

* cited by examiner

*Primary Examiner* — Jason M Greene
*Assistant Examiner* — Karla Hawkins
(74) *Attorney, Agent, or Firm* — Middleton Reutlinger; John F. Salazar; Chad D. Bruggeman (57) ABSTRACT

Apparatus related to an air filter and filter housing are disclosed herein. The filter housing and/or filter frame utilize heat shrinkable sealant pieces to enhance the sealing capabilities of the filter housing and/or filter frame.

20 Claims, 6 Drawing Sheets

FILTER HOUSING UTILIZING HEAT SHRINKABLE MATERIALS

TECHNICAL FIELD

Generally, a filter housing is taught. More specifically, present embodiments relate to a filter housing utilizing heat shrinkable materials.

BACKGROUND

Filters are often useful for filtering contaminants and/or particulates from a fluid flow. Such contaminants and/or particulates may be harmful to downstream components in the air flow or otherwise be undesirable. Filter housings or modules may be used to protect, support, and/or provide a mechanism for mounting a filter. For example, use of such a housing may allow for installation of a filter in a ceiling or wall or other structure through which air may be caused to flow.

Filter modules or housings often have an inlet and an outlet with a filter disposed therebetween to filter a fluid flow. In order to channel the fluid flow through the filter, the housing walls or other structure may form a channel to prevent the fluid flow from bypassing the filter. However, it is often impractical to form the housing from a solid piece, thus there are often joints in the housing. Joints, where housing panels or walls come together, form an area susceptible to gapping or otherwise allowing the fluid flow to escape essentially unfiltered. Mitered edges have been incorporated into side walls or panels to help prevent unfiltered fluid escape. Also, sealants have been incorporated at the joints, and/or joints have at times been welded, to inhibit fluid escaping the housing other than as desired.

However, it has been found that the use of sealant is not a consistent and reliable means for establishing a satisfactorily leak proof filter housing construction. Also, welding is not always a possible, practical, and/or cost effective means of establishing a satisfactorily leak proof filter housing construction.

Thus, there is a need in the art for overcoming the issues of existing systems.

SUMMARY

The present disclosure is directed towards apparatus for filtering a fluid flow that have a filter housing and heat shrinkable joints seals. The filter housing is, in various embodiments, an apparatus comprising a plurality of side walls forming a plurality of joints. The joints are sealed with heat shrinkable joint sealant pieces to improve the sealing capability of the filter housing so that a fluid flow can pass through an inlet or in-flow side of the filter housing, through an air filter, and exit through an exit screen or out-flow side of the filter housing with improved filtering efficiency.

Generally, in one aspect, a filter housing having heat shrinkable joint seals is provided. The air filter includes a filter housing having a plurality of side panels that, together, form a perimeter of the housing and are arranged end to end to form a plurality of joints. The housing also has an inlet panel, which includes an inlet duct, that is disposed across the perimeter of the housing. An exit screen is also disposed across the housing perimeter but is so disposed opposite the inlet panel. A heat shrinkable joint seal is configured and positioned at each joint to help seal the housing, wherein the heat shrinkable joint seals extend at least partially along the side panels. Optionally, at least one of the joints may include mitered side panel ends. A filter may be included and may be retained at least partially within the filter housing. If included, the filter may have a frame with one or more filter corner sealant pieces attached to it to help seal the filter frame. Optionally, the perimeter formed by the side panels may be rectangular in shape.

Generally, in another aspect, a filter housing having heat shrinkable joint seals is provided. The filter housing includes a plurality of side panels that form a perimeter of the housing and are arranged end to end to form a plurality of joints. An exit screen is disposed across an out-flow side of the filter housing. Heat shrinkable joint seals are configured to seal the joints, and the heat shrinkable joint seals extend at least partially along the side panels. At least one landing extends inwardly from one or more side panels and is adapted to support an air filter at least partially within the filter housing. Optionally, one or more of the heat shrinkable joint seals may include a landing extension to slidably engage the landing(s). A knife edge may extend from the landing(s) and be transverse to the landing(s). If a knife edge is included, the heat shrinkable joint seal(s) may include a landing extension and a knife edge extension to slidably engage both. An inlet panel may be included, which, if included, may have an inlet duct. The filter housing may include a filter at least partially retained within the filter housing. If a filter is included, it may include a frame having one or more filter corner sealant pieces attached to it.

Generally, in another aspect, an air filter and filter housing is provided having heat shrinkable joint seals. The filter housing has a plurality of side walls that form a perimeter of the housing, at least partially define an internal cavity, and are arranged end to end to form a plurality of joints. The filter housing has an inlet panel proximate an in-flow side of the filter housing. The inlet panel includes an inlet duct and, with the side panels, partially defines the internal cavity. An exit screen is disposed across an out-flow side of the filter housing, which is oppositely disposed the in-flow side. At least one landing extends inwardly from the side panel(s) at least partially across the internal cavity and is configured to help retain the air filter at least partially within the filter housing. The air filter is interposed between the in-flow side and the out-flow side and is at least partially retained at least partially within the filter housing by the landing. A plurality of heat shrinkable joint seals, each configured to seal a respective joint of the filter housing, are provided and each heat shrinkable joint seal extends at least partially along at least two side panels. Optionally, at least one knife edge extends from the landing(s) and is transverse to the landing(s). If a knife edge is included, the heat shrinkable joint sealant pieces may include one or more landing extensions and knife edge extensions suitable to slidably engage the landing(s) and knife edge(s). The air filter may include a filter frame. If a filter frame is included, one or more heat shrinkable filter frame sealant pieces may be attached to the filter frame.

DETAILED DESCRIPTION

It is to be understood that the embodiments are not limited in their application to the details of construction and the arrangement of components set forth in the following description or illustrated in the drawings. Other embodiments are possible and may be practiced or carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected" or "coupled" and variations thereof herein are used broadly and encompass direct and indirect connections and couplings. In addition, the terms "connected" or "coupled" and variations thereof are not restricted to physical or mechanical connections or couplings.

Figure 1:
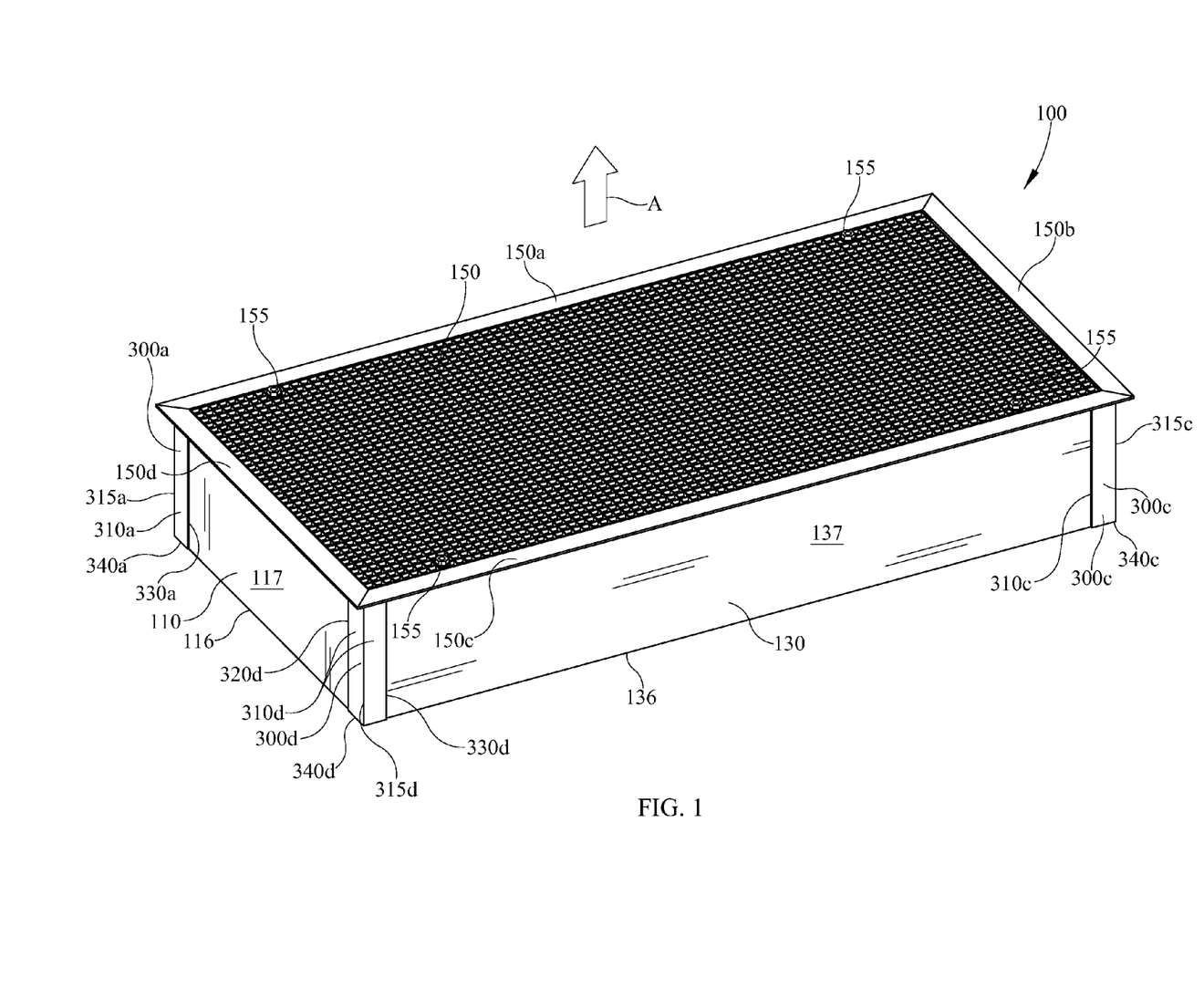
FIG. 1 is a perspective view of an embodiment of a filter housing.
Figure 2:
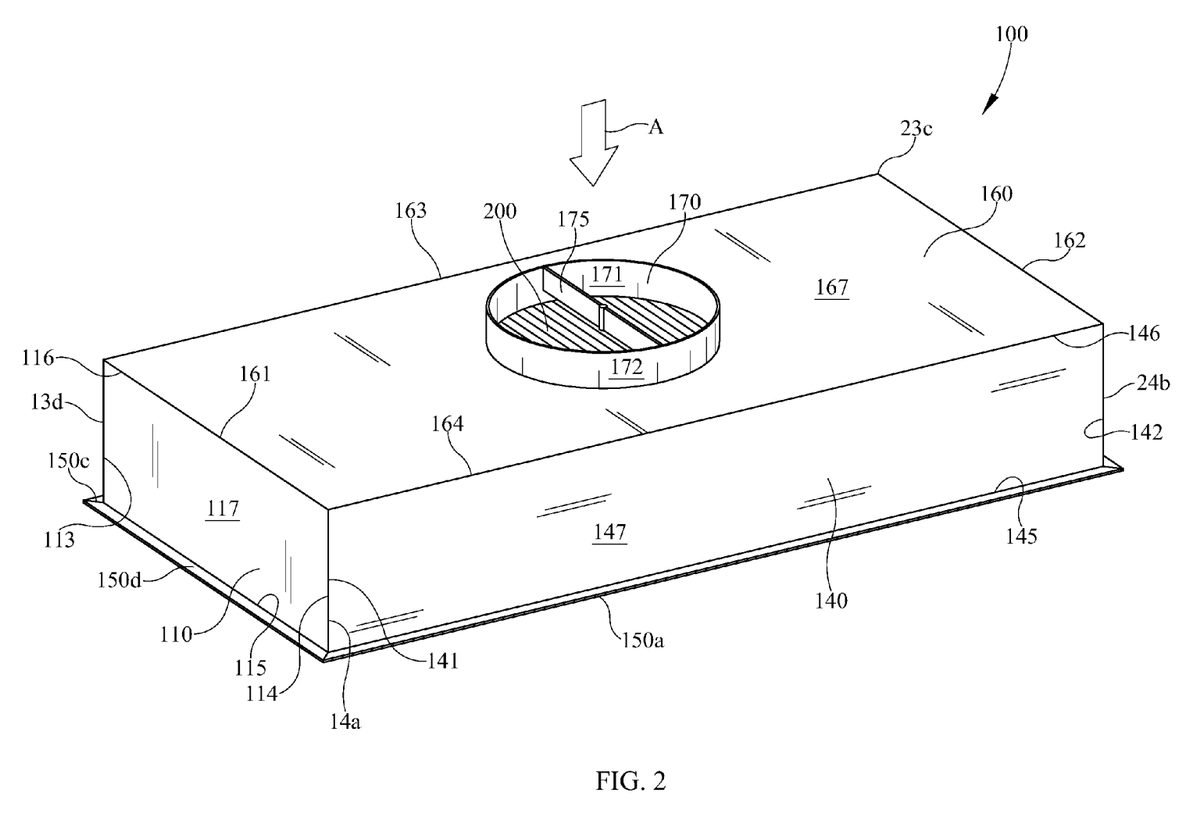
FIG. 2 is a second perspective view of the filter housing according to FIG. 1.
Figure 3:
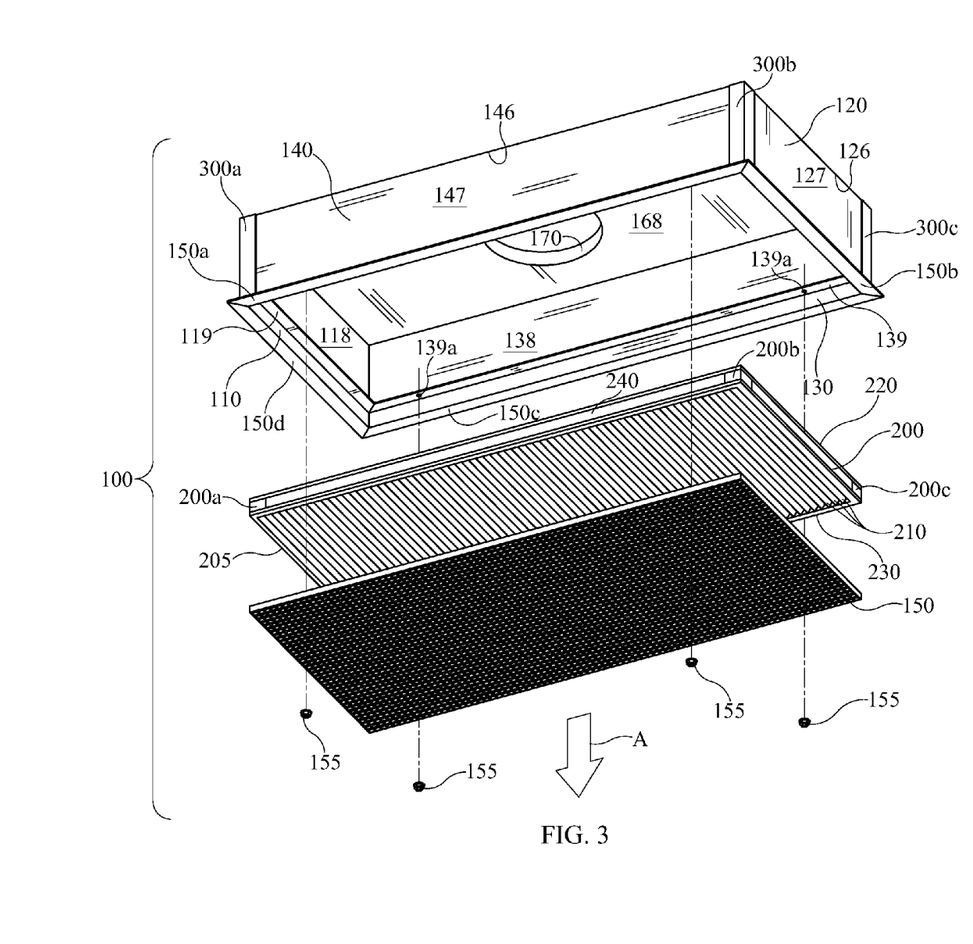
FIG. 3 is an exploded perspective view of the filter housing according to FIGS. 1 and 2, including an embodiment of a filter.

Referring initially to FIGS. 1-3, an embodiment of a filter housing 100 is depicted as it may be oriented relative to a fluid flow, such as air flow A. Air flow A may enter through an in-flow side of filter housing 100, pass through a filter 200, and then exit through an out-flow side of filter housing 100. For example, air flow A may enter through an inlet duct 170 located on or near an in-flow side, or inlet panel 160, flow through filter 200, and/or exit through an out-flow side, or exit screen 150. Filter housing 100 may include a side wall, which may form a side perimeter, to substantially surround an outer periphery or perimeter or frame of filter 200. Such a side wall may protect and/or support filter 200 and/or form a leak resistant channel around filter 200 to inhibit air flow A from exiting filter housing 100 through the side wall. Such a side wall and/or perimeter may be formed, for example, by side panels 110, 120, 130, 140, which may have respective outer surfaces 117, 127, 137, 147. It is understood that air flow A may flow through filter housing 100 and/or filter 200 in a direction opposite the direction shown (resulting in exit screen 150 being located at the inlet side relative to air flow A and/or inlet panel 160 being located at the outlet side) or in any of a variety of directions, such as, for example, at an angle relative to any or all of the sides and/or surfaces of the filter housing 100 and/or filter 200.

Inlet panel 160, and/or inlet side or inlet panel inner surface 168, together with side panels 110, 120, 130, 140 and/or respective side panel inner surfaces 118, 128 (not shown), 138, 148 (not shown), may substantially define an internal cavity of filter housing 100. Filter 200 may be at least partially located or situated within this internal cavity. Filter 200 may be disposed in filter housing 100 in such a way that filter housing 100 retains filter 200 in a desired position. In this way, filter 200 may, for example, be removably installed in filter housing 100. In some embodiments, filter 200 may be located completely within the internal cavity so that a substantially planar exit screen 150 may cover filter 200. Thus, inlet panel 160, exit screen 150, and side panels 110, 120, 130, 140 of filter housing 100 may completely surround filter 200. Completely surrounding filter 200 may protect filter 200, facilitate mounting and/or installation, and/or serve any of a variety of other function. It is understood, however, that filter housing 100 may only partially enclose or surround filter 200, and complete surrounding of filter 200 is not required. Inlet panel 160 may be correspondingly shaped to mate with the side perimeter formed by side panels 110, 120, 130, 140.

Inlet panel 160 may include inlet duct 170. Inlet duct 170 may optionally be included, and may, if included, be an annular projection extending from inlet panel 160 and/or inlet panel outer surface 167, as shown. Inlet duct 170 may have an inner surface 171, an outer surface 172, and/or a cross member 175. Either or both of inlet duct inner surface 171 and outer surface 172 may be adapted to connect to other duct work or other structure, for example, a duct or pipe to introduce air flow A to filter housing 100. Cross member 175 may be included to provide structural support and/or louvers to facilitate control of air flow A through inlet duct 170. It is understood that any of a variety of shapes may be used for inlet duct 170, including, but not limited to, annular, round, circular, tubular, triangular, square, rectangular, conical, spherical, semi-spherical, ovular, or any other shape, or a combination thereof. It is further understood that an opening or other device or structure may be included instead of or in addition to inlet duct 170. For example, inlet panel 160 may simply have one or more openings and/or a screen or mesh to allow air flow A therethrough.

Exit screen 150 may be located in air flow A downstream of filter 200 and/or inlet panel 160. Exit screen 150 may be substantially a mesh-like structure or screen that may provide structural rigidity or resilience and/or be sufficiently permeable to allow air flow A therethrough. In some embodiments, exit screen 150 may be a separate piece of filter housing 100. In other embodiments, exit screen 150 may be a part of inlet panel 160 and/or filter 200. Although depicted as substantially rectangular and/or planar, it is understood that exit screen 150 may be any of a variety of shapes, including, but not limited to, square, triangular, polygonal, round, ovular, spherical, concave, convex, annular, or any other shape, or any combination thereof. A screen retention mechanism, such as one or more screen bolts and/or screen nuts 155, may be used to secure the exit screen 150 to the rest of the filter housing 100 and/or retain, at least partially, filter 200 within filter housing 100. For example, screen bolts and/or screen nuts 155 may be secured to filter housing 100 via bolt holes such as, for example, bolt holes 139a that may be included in a landing 139, if landing 139 is included. Although not shown, other landings may be included, any or all of which may include bolt holes instead of, or in addition to, bolt holes 139a.

Flanges 150a, 150b, 150c, 150d may be included and may be located at or near an outer perimeter of exit screen 150 or otherwise near the out-flow side of filter housing 100. Flanges 150a, 150b, 150c, 150d may be attached to, connected to, and/or integral with side panels 110, 120, 130, 140. Flanges 150a, 150b, 150c, 150d may be attached to, connected to, and/or integral with exit screen 150 instead of or in addition to side panels 110, 120, 130, 140. Flanges 150a, 150b, 150c, 150d may be used for any of a variety of purposes, including, but not limited to, providing structure for mounting to another structure, such as, for example, a ceiling or wall or other mounting structure. For another example, flanges 150a, 150b, 150c, 150d may be included to seal or cover an opening in a structure such as, for example, a wall or ceiling wherein filter housing 100 may be inserted and/or installed.

Filter 200 may filter air flow A as desired. Filter 200 may also be of a corresponding shape and/or size so that it may be disposed across some or all of the internal cavity of filter housing 100. For example, filter 200 may be substantially rectangular and planar, as shown, but it is understood that filter 200 may be any of a variety of shapes, including, but not limited to, square, triangular, polygonal, round, ovular, spherical, concave, convex, annular, or any other shape, or any combination thereof. Further, it is understood that filter 200 need not necessarily correspond in size or shape with filter housing 100, although such correspondence may improve filtering ability and/or efficiency. Filter 200 may include any of a variety of filtering materials, including, but not limited to, non-wovens, knits, scrims, woven fabrics, porous membranes, and/or any other material or combination thereof, such as a stacked composite filtering media. Filter 200 may be pleated, embossed, and/or formed with any of a variety of features. It is understood that filter 200 is optional and some embodiments may not include filter 200.

Figure 4A:
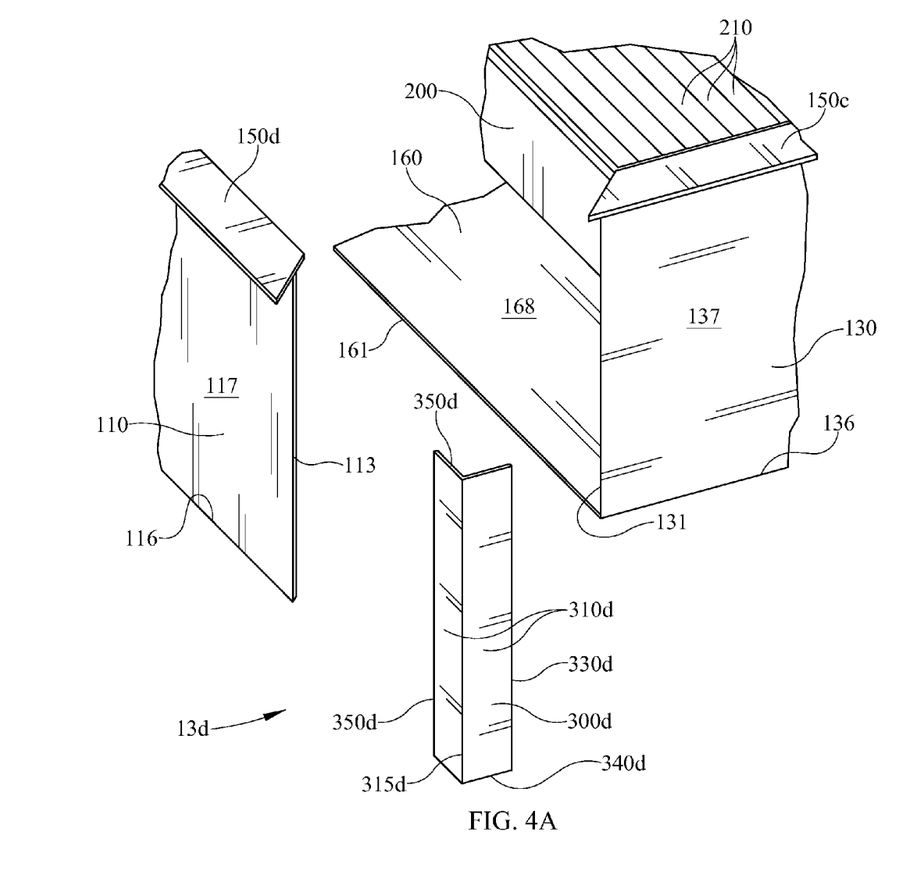
FIG. 4A is an exterior perspective view of an embodiment of a corner portion of a filter housing.
Figure 4B:
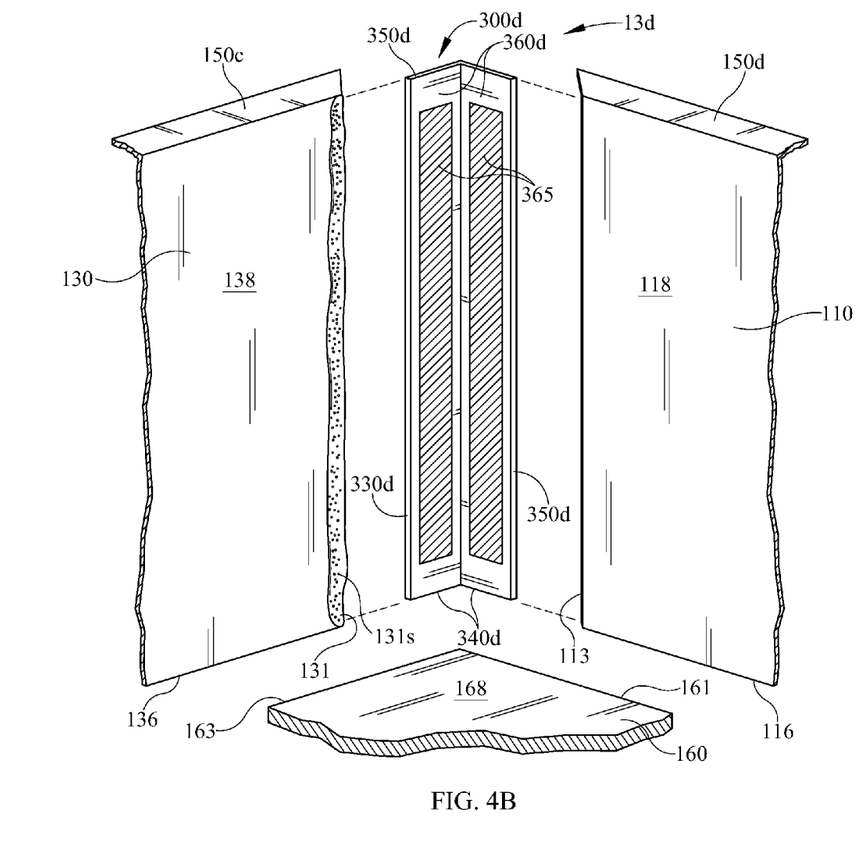
FIG. 4B is an interior perspective view of the corner portion of the filter housing according to FIG. 4A.

The side wall may be formed of a plurality of side panels, such as, for example, first side panel 110, second side panel 120, third side panel 130, and/or fourth side panel 140. The side panels 110, 120, 130, 140 may be positioned end to end in angled relationship to form the side perimeter of filter housing 100, such as is shown in the figures. Side panels 110, 120, 130, 140 may be arranged to form a plurality of joints, such as joints 14a, 13d, 23c, 24b, where the ends of the panels are attached and/or connected. For example, first panel 110 may have a first end 114 that is adapted and/or oriented to correspond to a first end 141 of fourth panel 140 to form corner 14a. Similarly, first panel 110 may have a second end 113 that is adapted and/or oriented to correspond to a first end 131 of third panel 130 to form corner 13d; third panel 130 may have a second end 132 that is adapted and/or oriented to correspond to a first end 123 of second panel 120 to form corner 23c; and/or second panel 120 may have a second end 124 that is adapted and/or oriented to correspond to a second end 142 of fourth panel 140 to form corner 24b. Any or all of the aforementioned side panel ends may be mitered and/or angled to enhance mating and/or enhance sealing, such as, for example, as shown in FIGS. 4A and 4B. It is understood that the side panel ends need not be mitered and/or may be otherwise shaped and/or formed in ways understood in the art to enhance sealing, if so desired. Side panels may have a height dimension measured in air flow direction A, as shown, and/or a width dimension transverse thereto, measured from end to end (or joint to joint).

It is understood that, although depicted in the figures as substantially rectangular in shape, filter housing 100 may be any of a variety of shapes, including but not limited to, square, rectangular, triangular, otherwise polygonal, round, ovular, annular, conical, spherical, semi-spherical, or any of a variety of other shapes or combination thereof. It is further understood that any of a variety of shapes of side walls may be used, such as round or arcuate side panels, some of which shapes may include or require any of a variety of joint angles, including a 180 degree joint angle, to form the side perimeter. Further still, it is understood that any of a variety of materials may be used to construct any or all components of filter housing 100. For example, panels 110, 120, 130, 140, 160 and/or exit screen 150 may be made of any of a variety of materials, including, but not limited to, plastic, rubber, wood, fiberglass, and/or metals, such as, for example, aluminum, steel, or any other metal, or any other material, or a combination thereof.

Joint sealant pieces 300a, 300b, 300c, 300d may be included in or with filter housing 100. Each of joint sealant pieces 300a, 300b, 300c, 300d may be sized, configured, and/or adapted to sealingly overlay a respective joint 14a, 24b, 23c, 13d of filter housing 100. In this way, filter housing 100 may be made more resistant to leaking of a fluid flow, such as air flow A, passing therethrough. Each joint sealant piece 300a, 300b, 300c, 300d may be defined by ends and/or sides. For example, first joint sealant piece 300a may extend from in-flow end 340a to out-flow end 350a (not shown), and/or may extend from first side 320a (not shown) to second side 330a. Similarly, second joint sealant piece 300b, third joint sealant piece 300c, and/or fourth joint sealant piece 300d may extend from respective in-flow ends 340b, 340c, 340d to respective out-flow ends 350b, 350c, 350d, and/or from respective first sides 320b, 320c, 320d to respective second sides 330b, 330c, 330d. Any or all of joint sealant pieces 300a, 300b, 300c, 300d may have a height in a direction from the in-flow side to the out-flow side that is at least about the height of the corner or joint where corresponding side panels meet, connect, or approach one another. Any or all of joint sealant pieces 300a, 300b, 300c, 300d may have a height in a direction from the in-flow side to the out-flow side that is less than the height of the corner or joint where corresponding side panels meet, connect, or approach one another. For example, in some embodiments joint sealant pieces 300a, 300b, 300c, 300d may extend from approximately landing 119, 129, 139, 149 and/or filter 200 to approximately exit screen 150 and/or the out-flow side of filter housing 100. The height of joint sealant pieces 300a, 300b, 300c, 300d, in some embodiments, may be such that the joint sealant pieces 300a, 300b, 300c, 300d extend beyond any or all side panels 110, 120, 130, 140 and/or overlap any or all of inlet panel 160, exit screen 150, flanges 150a, 150b, 150c, 150d, and/or side panels 110, 120, 130, 140.

Joint sealant pieces 300a, 300b, 300c, 300d may have a length in one or more directions transverse to the height. Each joint sealant piece may have a length in a respective first direction and/or a respective second direction which extends along the length of a corresponding side panel 110, 120, 130, 140. Each joint sealant piece 300a, 300b, 300c, 300d may have a respective outer surface 310a, 310b, 310c, 310d. Outer surfaces 310a, 310b, 310c, 310d may be shaped, sized, adapted, and/or configured to correspond to the side panels 110, 120, 130, 140, although it is not required that any or all of the outer surfaces 310a, 310b, 310c, 310d so correspond. Outer surfaces 310a, 310b, 310c, 310d may be made to take on any of a variety of shapes and/or sizes for any of a variety of purposes.

Optionally, filter 200 may include filter corner sealant pieces 200a, 200b, 200c, 200d (not shown) instead of, or in addition to, joint sealant pieces 300a, 300b, 300c, 300d. If included, filter corner sealant pieces 200a, 200b, 200c, 200d may help seal the corners where filter first end 205 is adjacent filter first side 230, filter first side 230 is adjacent filter second end 220, filter second end 220 is adjacent filter second side 240, and/or filter second side 240 is adjacent filter first end 205. Together, filter ends 205, 220 and filter sides 230, 240 may form a filter frame. Filter corner sealant pieces 200a, 200b, 200c, 200d may be shaped and/or sized to correspond to filter ends 205, 220 and/or filter sides 230, 240, for example, in substantially the same way as joint sealant pieces 300a, 300b, 300c, 300d are shaped and/or sized to correspond to side panels 110, 120, 130, 140, as described above. It is understood that filter corner sealant pieces 200a, 200b, 200c, 200d may be shaped and/or sized in any of a variety of ways, including independently of filter ends 205, 220 and/or filter sides 230, 240.

Referring now to FIGS. 4A and 4B, any or all of joint sealant pieces 300a, 300b, 300c, 300d may have one or more inner surfaces, such as for example, inner seal surface 360d of joint sealant piece 300d. Inner seal surface 360d may be shaped, sized, configured, and/or adapted to mate with outer surface 117 of first side panel 110 and/or with outer surface 137 of third side panel 130. Optionally, inner seal surface 360d (and/or any or all inner surfaces of joint sealant piece 300d and/or any other joint sealant piece) may include an adhesive to facilitate securing joint sealant piece 300d (or other piece) to corresponding side panels 110, 130 (or other side panels). Also, a sealant, such as sealant 131s, may be applied to any or all ends of any or all side panels, such as first end 131 of third side panel 130, as shown. Sealant 131s, if included, may facilitate the construction and/or sealing of filter housing 100.

Any or all of joint sealant pieces 300a, 300b, 300c, 300d may have a first state or condition and a second state or condition. For example, joint sealant pieces 300a, 300b, 300c, 300d may be heat shrinkable so that the application of heat will cause joint sealant pieces 300a, 300b, 300c, 300d to transform or convert from a first condition, such as a certain height and/or length, to a second condition, such as a smaller (or shrunken) height and/or length. In this way, joint sealant pieces 300a, 300b, 300c, 300d may, for example, enhance the sealing capabilities of filter housing 100. Any of a variety of materials capable of transforming from a first state to a second state, such as heat shrinkable materials may be used for joint sealant pieces 300a, 300b, 300c, 300d. For example, any of a variety of thermoplastics may be used, or any other heat shrinkable material, or a combination thereof. If optional filter corner sealant pieces 200a, 200b, 200c, 200d are included, any or all of them may adhere to corresponding filter ends 205, 230 and/or filter sides 220, 240 and/or be heat shrinkable from a first size to a second, smaller size, for example, in substantially the same way as that described above regarding joint sealant pieces 300a, 300b, 300c, 300d. It is understood that this is merely an example of how filter corner sealant pieces 200a, 200b, 200c, 200d may operate or be used, and that they may operate independently or differently than joint sealant pieces 300a, 300b, 300c, 300d.

Figure 5:
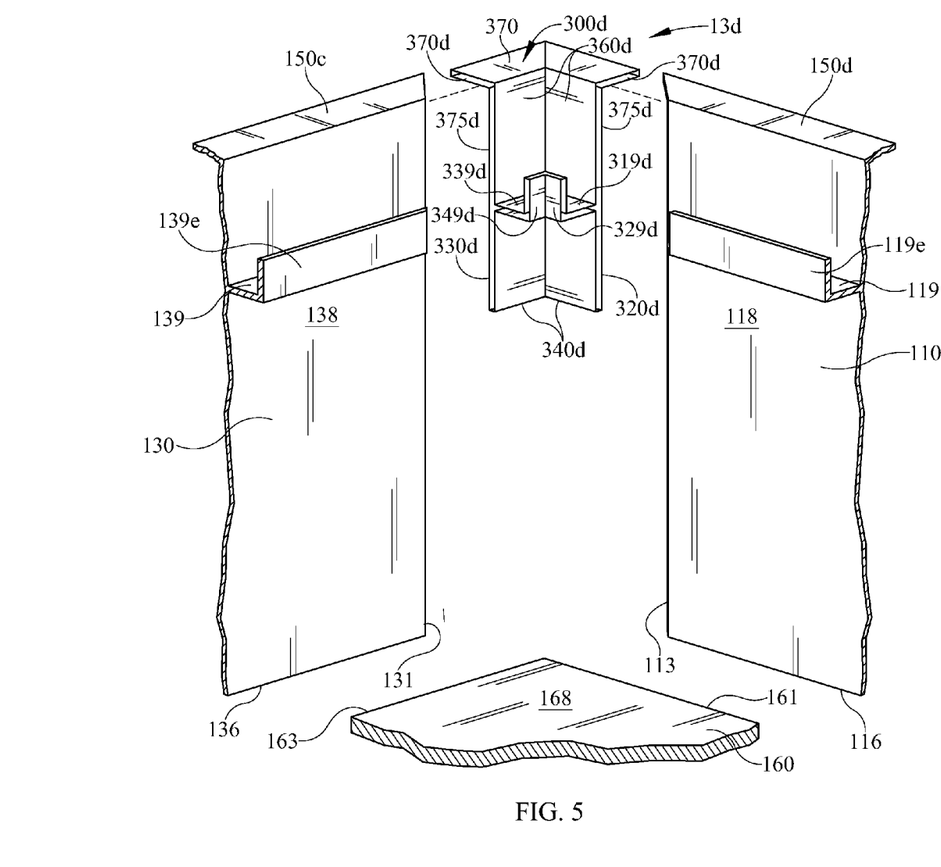
FIG. 5 is a perspective view of a corner portion of an embodiment of a filter housing.

Referring now to FIG. 5, in some embodiments, any or all of side panels 110, 120, 130, 140 may include one or more landings 119, 129, 139, 149, such as, for example, first side panel landing 119 and/or third side panel landing 139. First side panel landing 119 and third side panel landing 139, and/or any addition side panel landings such as, for example, second side panel landing 129 (not shown) or fourth side panel landing 149 (not shown), may be included to provide a mechanical stop and/or aid in sealing the interface of filter 200 and housing 100, or may be included for any other reason. It is understood that any or all of landings 119, 129, 139, 149, if included, may be located anywhere on respective side panels 110, 120, 130, 140. It is further understood that any or all of landings 119, 129, 139, 149 may be of virtually any length and/or width, and may be substantially continuous or discontinuous. Further still, landings 119, 129, 139, 149, if included, may be oriented at any of a variety of angles and may be any of a variety of shapes, including, but not limited to, straight and/or linear, curved, wavy, bent, angled, or any other shape, or a combination thereof.

Landings 119, 129, 139, 149, if included, may include respective knife edges 119e, 129e, 139e, 149e (129e and 149e not shown), which may further improve sealing at the interface of filter 200 and housing 100. Any or all of knife edges 119e, 129e, 139e, 149e may be pressed into or against, inserted into, and/or attached to filter 200 in order to, for example, help retain filter 200 within filter housing 100. If included, any or all of landings 119, 129, 139, 149 and/or knife edges 119e, 129e, 139e, 149e may be mitered, instead of or in addition to mitering any or all of side panel ends, at or near respective side panel ends (e.g., landing 119 and/or knife edge 119e may be mitered at or near first side panel second end 113, and/or landing 139 and/or knife edge 139e may be mitered at or near third side panel first end 131).

Any or all of joint seals 300a, 300b, 300c, 300d, such as, for example, joint seal 300d (shown in FIG. 5) or any other of joint seals 300a, 300b, 300c (not shown in FIG. 5), may include protrusions or extensions, such as, for example, landing protrusions or extensions 319d, 339d and/or knife edge protrusions or extensions 329d, 339d. Landing extensions 319d, 339d and/or knife edge extensions 329d, 349d may be included to facilitate inserting, slidably engaging, and/or attaching landings 119, 139, if included, and/or knife edges 119e, 139e, if included, in joint seal 300d. It is understood that any or all of joint seals 300a, 300b, 300c, 300d may include similar or different landing extensions and/or knife edge extensions, which may correspond to respective landings and/or knife edges that may be similar or different in comparison to landings 119, 139 and/or knife edges 119e, 139e. In this way, joint seals 300a, 300b, 300c, 300d may be configured to facilitate slidably engaging any or all of side panels 110, 120, 130, 140 and/or any landing 119, 129, 139, 149 and/or any knife edge 119e, 129e, 139e, 149e that may be included.

In use, a filter housing may be constructed, for example, by assembling filter housing 100 of side panels 110, 120, 130, 140, which may form one or more corners or joints, such as joints 14a, 24b, 23c, 13d; forming one or more heat shrinkable seals, such as joint sealant pieces 300a, 300b, 300c, 300d, each of which may overlay one of joints 14a, 24b, 23c, 13d and/or be shrinkable from a first size to a second size upon application of heat; attaching joint sealant pieces 300a, 300b, 300c, 300d to respective joints 14a, 24b, 23c, 13d; and/or applying heat to joint sealant pieces 300a, 300b, 300c, 300d thereby shrinking joint sealant pieces from a first size to a second size. Optionally, filter 200 and/or exit screen 150 may be inserted, installed, connected to, integrated with, and/or attached to filter housing 100.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and embodiments have been presented for purposes of illustration. It is not intended to be exhaustive or to limit the precise steps and/or forms disclosed, and obviously many modifications and variations are possible in light of the above teaching. It is intended that the scope and all equivalents be defined by the claims appended hereto.

What is claimed is:

1. A filter housing having heat shrinkable joint seals comprising:
   a filter housing having a plurality of side panels;
   said plurality of side panels forming a perimeter of said housing and arranged end to end forming a plurality of joints;
   said filter housing having an inlet panel including an inlet duct, said inlet panel disposed across said perimeter of said filter housing;
   an exit screen disposed across said perimeter and opposite said inlet panel; and
   wherein at least one of said plurality of joints extend from adjacent said inlet panel to adjacent said exit screen in a direction of air flow;
   a plurality of heat shrinkable joint seals, wherein at least one of said plurality of heat shrinkable joint seals is configured to seal said at least one of said plurality of joints from adjacent said inlet panel to adjacent said exit screen and extend at least partially along a length of each of at least two adjacent side panels of said plurality of side panels creating said at least one of said plurality of joints, wherein said length is transverse to said direction of air flow.

2. The filter housing of claim 1 wherein at least one joint of said plurality of joints includes mitered side panel ends.

3. The filter housing of claim 1 wherein said inlet duct is an annular inlet duct.

4. The filter housing of claim 1 further comprising a filter, wherein said filter is retained at least partially within said filter housing.

5. The filter housing of claim 4 wherein said filter includes a filter frame and one or more filter corner sealant pieces attached to said filter frame.

6. The filter housing of claim 1 wherein said perimeter formed by said plurality of side panels is rectangular.

7. A filter housing having heat shrinkable joint seals comprising:
   a filter housing having a plurality of side panels, wherein said filter housing defines an in-flow side and an opposing out-flow side;
   said plurality of side panels forming a perimeter of said filter housing and arranged end to end forming a plurality of joints, wherein at least one of said plurality of joints extends in a direction of air flow from adjacent said in-flow side to adjacent said out-flow side;
   an exit screen disposed across said out-flow side of said filter housing;
   a plurality of heat shrinkable joint seals, wherein at least one of said plurality of heat shrinkable joint seals is configured to seal said at least one of said plurality of joints and extend at least partially along a length of at least two adjacent said side panels creating said at least one of said plurality of joints, wherein said length is transverse to said direction of air flow; and at least one landing extending inwardly from one or more of said plurality of side panels, said at least one landing adapted to support an air filter at least partially within said filter housing.

8. The filter housing of claim 7 wherein at least one of said heat shrinkable joint seals includes a heat shrinkable landing extension adapted to slidably engage said at least one landing.

9. The filter housing of claim 7 further comprising at least one knife edge attached to said at least one landing, said at least one knife edge extending transverse to said landing.

10. The filter housing of claim 9 wherein at least one of said heat shrinkable joint seals includes a heat shrinkable landing extension adapted to slidably engage said at least one landing, and at least one of said heat shrinkable joint seals includes a heat shrinkable knife edge extension adapted to slidably engage said at least one knife edge.

11. The filter housing of claim 7 further comprising an inlet panel disposed opposite said exit screen.

12. The filter housing of claim 11 wherein said inlet panel includes an inlet duct.

13. The filter housing of claim 7 further comprising a filter, wherein said filter is retained within said filter housing.

14. The filter housing of claim 13 wherein said filter includes a filter frame and one or more filter corner sealant pieces attached to said filter frame.

15. An air filter and filter housing having heat shrinkable joint seals comprising:
an air filter;
a filter housing having a plurality of side panels, wherein said filter housing defines an in-flow side and an opposing out-flow side;
said side panels forming a perimeter of said housing and arranged end to end forming a plurality of joints, said side panels at least partially defining an internal cavity, wherein at least one of said plurality of joints extends in a direction of air flow from adjacent said in-flow side to adjacent said out-flow side;
said filter housing having an inlet panel proximate said in-flow side of said filter housing, said inlet panel including an inlet duct allowing an air flow to enter said filter housing;
an exit screen disposed across said out-flow side oppositely disposed from said in-flow side;
at least one landing inwardly extending from at least one side panel of said plurality of side panels at least partially across said internal cavity, said at least one landing configured to at least partially retain said air filter at least partially within said internal cavity of said filter housing; and
a plurality of heat shrinkable joint seals, wherein at least one of said plurality of heat shrinkable joint seals is configured to seal said at least one of said plurality of joints and extend partially along a length of an outer surface of each of at least two adjacent said side panels creating said at least one of said plurality of joints, wherein said length is transverse to said direction of air flow.

16. The air filter and filter housing of claim 15 further comprising at least one knife edge extending from said at least one landing and is transverse to said at least one landing.

17. The air filter and filter housing of claim 16 wherein at least one heat shrinkable joint seal of said plurality of heat shrinkable joint seals includes a landing extension and a knife edge extension suitable to slidably engage said at least one landing and said at least one knife edge.

18. The air filter and filter housing of claim 15 further comprising one or more heat shrinkable filter corner sealant pieces, each attached to a respective corner of said air filter.

19. The filter housing of claim 1 wherein said at least one of said plurality of heat shrinkable joint seals is exterior to said at least two adjacent side panels of said plurality of side panels.

20. The filter housing of claim 1 wherein said at least one of said plurality of heat shrinkable joint seals extends only partially about said perimeter of said filter housing.

* * * * *